(12) United States Patent
Sawada (10) Patent No.: US 6,539,447 B1
(45) Date of Patent: Mar. 25, 2003

(54) INTERRUPT CONTROL SYSTEM

(75) Inventor: Akira Sawada, Yokohama (JP)

(73) Assignee: Elmic Systems, Inc., Kanagawa (JP)

( * ) Notice: Subject to any disclaimer, the term of this patent is extended or adjusted under 35 U.S.C. 154(b) by 0 days.

(21) Appl. No.: 09/362,365

(22) Filed: Jul. 28, 1999

(30) Foreign Application Priority Data

May 25, 1999 (JP) .......................................... 11-144357

(51) Int. Cl.⁷ ............................................. G06F 13/24
(52) U.S. Cl. ..................................................... 710/260
(58) Field of Search ................................ 710/260, 266, 710/269, 262–264

(56) References Cited

U.S. PATENT DOCUMENTS 5,768,599 A * 6/1998 Yokomizo .................... 710/260
6,003,108 A * 12/1999 Thielen ....................... 710/260
6,115,778 A * 9/2000 Miyake et al. .............. 710/260
6,128,728 A * 10/2000 Dowling ...................... 712/228

FOREIGN PATENT DOCUMENTS

JP         11-96022      4/1999

OTHER PUBLICATIONS

Japanese Document entitled REAL-TIME LINUX, By Michael Barabanov et al., dated Mar. 3, 1996.

* cited by examiner

Primary Examiner—Glenn A. Auve
Assistant Examiner—X. Chung-Trans
(74) Attorney, Agent, or Firm—Bachman & LaPointe (57) ABSTRACT

An information processing device includes an OS having an interrupt processing function and an OS support system which is activated through initialization of the OS. The OS support system includes an interrupt managing section for recording the contents of an interrupt process requiring a high realtime performance, and an interrupt judging section for receiving an interrupt request earlier than the OS does when the interrupt request occurs in the information processing device, and judging whether the interrupt request corresponds to the interrupt process recorded in the interrupt managing section. The OS support system further includes an interrupt executing section for executing the recorded interrupt process when the interrupt request corresponds to the recorded interrupt process. The OS support system causes the OS to execute an interrupt process which is not recorded in the interrupt managing section.

11 Claims, 8 Drawing Sheets

| 61 | ADDRESSES OF OS-SIDE STARTUP PROGRAM |
| | ············· |
| | ············· |
| 62 | ADDRESSES OF SUPPORT SYSTEM-SIDE STARTUP PROGRAM |
| | ············· |
| | ············· |
| 63 | ADDRESSES OF INITIALIZATION PROGRAM |
| | ADDRESSES OF VARIOUS INTERRUPT INFORMATION |
| | ADDRESSES OF INFORMATION WRITING ROUTINE |
| | ADDRESSES OF INFORMATION TO BE WRITTEN |
| | ADDRESSES OF INFORMATION READING ROUTINE |
| | ADDRESSES OF INFORMATION TO BE READ |

INTERRUPT CONTROL SYSTEM

BACKGROUND OF THE INVENTION

1. Field of the Invention

The present invention relates to a technique for supporting an interrupt managing function of an operating system (hereinafter referred to as "OS") of an information processing device and, in particular, to an OS support system which can coexist with an OS having an interrupt managing function of a low realtime characteristic or performance so as to enhance a realtime performance for a given interrupt process. The OS having the interrupt managing function of the low realtime performance represents such an OS that requires a relatively long time after an occurrence of an interrupt request until the start of execution of a corresponding interrupt process. For instance, it represents such an OS that requires ten-odd microseconds after an occurrence of an interrupt request until starting the execution of a corresponding interrupt process while the interrupt process should be executed within several microseconds.

2. Description of the Invention

In general, recent OS's have an interrupt managing function so that when an interrupt request is produced from a CPU (processor unit), the OS determines an interrupt cause and manages the interrupt processing according to a result of the determination.

Specifically, addresses of an interrupt processing means, which executes an interrupt process and other processes, are first set in an interrupt vector area formed in a fixed memory or the like accessible by the CPU. The interrupt processing means represents a program for executing an interrupt process corresponding to an interrupt cause and a startup/execution means thereof.

The CPU issues an interrupt request to the OS by referring to a base address (an address to be first referred to) of the vector area. The OS holds operation environment information of the CPU, such as the contents of CPU registers, before the interrupt and transfers a control right on the interrupt request to the interrupt processing means. After executing a required interrupt process, the interrupt processing means returns the control right to the OS. The OS restores the operation environment information of the CPU before the interrupt so that the CPU can restart the processing from the state at the time of suspension.

On the other hand, there are available such OS's whose realtime performance of the interrupt managing function does not reach a standard required by an application. For instance, it is assumed that an application requires execution of an interrupt process within several microseconds after an occurrence of an interrupt request. In this case, if an OS requires ten-odd microseconds for executing the interrupt process, the required interrupt process corresponding to the interrupt request can not be accomplished.

As appreciated, it is possible to enhance the realtime performance by reconstructing the interrupt managing function of the OS. In this case, however, it is necessary to investigate in advance the contents of the interrupt managing function of the OS and carry out operations for reconstruction and test, thereby resulting in huge cost. In addition, once the OS is altered, the reconstructed function should be modified upon every version-up of the OS. Moreover, when the altered OS is used, the managing manner of the vector area should be modified so as to match with the interrupt managing manner adopted by the altered OS.

SUMMARY OF THE INVENTION

Therefore, it is an object of the present invention to provide an interrupt processing method which can enhance, without altering an OS, a realtime performance for an interrupt process in a device installing the OS.

It is another object of the present invention to provide an OS support system which can coexist with the OS so as to enhance the realtime performance for the interrupt process.

It is another object of the present invention to provide an information processing device having the OS and the OS support system.

It is another object of the present invention to provide a storage medium suitable for realizing the interrupt processing method using a general-purpose information processing device.

According to one aspect of the present invention, there is provided an interrupt processing method comprising the steps of providing in an information processing device an OS having an interrupt managing function and an OS support system for executing a given interrupt process which requires a high realtime performance; causing the OS support system to take an interrupt request produced in the information processing device earlier than the OS does and to judge whether the interrupt request corresponds to the given interrupt process; causing the OS support system to execute the given interrupt process when the interrupt request corresponds to the given interrupt process while transferring a control right on the interrupt request from the OS support system to the OS when the interrupt request does not correspond to the given interrupt process.

In the foregoing method, a time required by the OS support system after receipt of the interrupt request until starting execution of the given interrupt process is shorter than a time required by the OS after receipt of the interrupt request until starting execution of a corresponding interrupt process.

The OS and the OS support system may execute the interrupt processing independently of each other, or may execute the interrupt processing cooperatively with each other in a shared manner. In the latter case, a driver may be incorporated in the OS for exchanging relative to the OS support system, and the OS and the OS support system execute different interrupt processes in the same hardware in a shared manner via the driver. With this arrangement, the high-level interrupt processing corresponding to uses can be implemented while maintaining identity of the OS.

For enhancing generality, the OS support system may be installed in the information processing device after the OS is installed in the information processing device.

According to another aspect of the present invention, there is provided an OS support system which coexists with an OS having an interrupt processing function in an information processing device and is activated through initialization of the OS, the system comprising an interrupt recording section for recording contents of an interrupt process requiring a high realtime performance; an interrupt judging section for receiving an interrupt request earlier than the OS does when the interrupt request occurs in the information processing device, and judging whether the interrupt request corresponds to the interrupt process recorded in the interrupt recording section; and an interrupt executing section for executing the interrupt process when the interrupt request corresponds to the interrupt process, wherein the OS support system causes the OS to execute an interrupt process which is not recorded in the interrupt recording section.

It may be arranged that the OS support system coexists with the OS while maintaining identify of the OS, and implements interrupt processing independently of the OS. Alternatively, it may be arranged that a control driver is incorporated in the OS for realizing cooperation with the OS support system and that the OS support system implements interrupt processing cooperatively with the OS in a shared manner. In the latter case, it is easy to execute an interrupt process requiring a high realtime performance and an interrupt process not requiring it in a shared manner for the same control object.

According to another aspect of the present invention, there is provided an information processing device comprising a CPU issuing an interrupt request, an OS having an interrupt vector area and an OS support system having an extended interrupt vector area, wherein the CPU is capable of changing a base address of the interrupt vector area or the extended interrupt vector area to be referred to, wherein the interrupt vector area is set so that a control right is transferred to an interrupt process in the OS, and wherein the OS support system sets contents of the extended interrupt vector area so that a control right is transferred to an interrupt process in the OS support system, notifies the base address of the extended interrupt vector area to the CPU for referring thereto so as to receive the interrupt request earlier than the OS does, executes, when the interrupt request is recorded in the extended interrupt vector area, a corresponding interrupt process, and transfers, when the interrupt request is not recorded in the interrupt vector area, a control right on the interrupt request to the OS according to contents set in the interrupt vector area.

It may be arranged that the OS support system holds a part of operation environment information of the CPU upon judging whether the interrupt request corresponds to a given interrupt process and, when the interrupt request corresponds to the given interrupt process, the OS support system holds the remaining part of the operation environment information and executes the given interrupt process and, when the interrupt request does not correspond to the given interrupt process, the OS support system restores the part of operation environment information and transfers the control right to the OS. With this arrangement, unnecessary overhead can be avoided.

For using the information processing device in communications, it may be arranged that a transmission section is provided for producing interrupts upon receiving data and upon transmitting data and that the interrupts are inputted to the OS support system.

When executing an interrupt process requiring a high realtime performance and an interrupt process not requiring it in a shared manner relative to the same control object, a control driver may be further provided so as to allow the OS and the OS support system to cooperate with each other.

According to another aspect of the present invention, there is provided a storage medium storing digital information, such as program codes, readable by an information processing device installing an OS having an interrupt processing function, the digital information creating in the information processing device an interrupt recording section for recording contents of an interrupt process requiring a high realtime performance; an interrupt judging section for receiving an interrupt request earlier than the OS does when the interrupt request occurs in the information processing device, and judging whether the interrupt request corresponds to the interrupt process recorded in the interrupt recording section; an interrupt executing section for executing the interrupt process when the interrupt request corresponds to the interrupt process; and a section for transferring a control right on the interrupt request to the OS when the interrupt request does not correspond to the interrupt process.

BRIEF DESCRIPTION OF THE DRAWINGS

The present invention will be understood more fully from the detailed description given hereinbelow, taken in conjunction with the accompanying drawings.

In the drawings.

DESCRIPTION OF THE PREFERRED EMBODIMENT

Now, preferred embodiments of the present invention will be described hereinbelow with reference to the accompanying drawings.

First Embodiment

In this embodiment, the present invention is applied to a portable terminal designed for serial communications. In the portable terminal installing an OS of a low realtime performance, the interrupt processing upon receiving or transmitting data is so delayed as to generate communication errors in case of high-speed transmission. Thus, in this embodiment, an OS support system is further installed in the portable terminal installing the OS so as to enhance a realtime performance for the interrupt processing upon implementing the serial communications.

Figure 1:
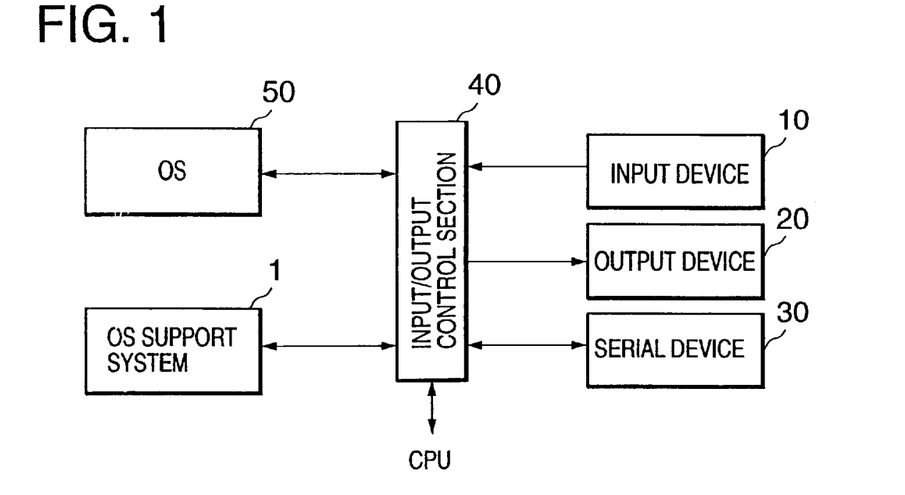
FIG. 1 is a diagram showing a configuration of the main part of a portable terminal according to a first preferred embodiment of the present invention.

FIG. 1 is a diagram showing a configuration of the main part of a portable terminal according to the first preferred embodiment of the present invention. The shown portable terminal is an information processing device incorporating a CPU which issues interrupt requests. The portable terminal comprises an input device 10 such as an operator control board, an output device 20 such as a display, a serial device 30 including communication ports and a control unit therefor, an input/output control section 40 which includes a storage medium, such as a hard disk, storing various programs, data and other digital information and which is created through execution of a given program by the CPU, an OS 50 and an OS support system 1. In this embodiment, the OS support system 1 is formed in the portable terminal by installing digital information stored in a portable storage medium.

Between the serial device 30 and the input/output control section 40 are provided a reception data buffer for storing data received via a non-shown communication line (hereinafter referred to as "received data") and a transmission data buffer for storing data to be transmitted via the communication line (hereinafter referred to as "transmission data"). The CPU is capable of changing a base address of a vector area or an extended vector area which will be described later.

Figure 2:
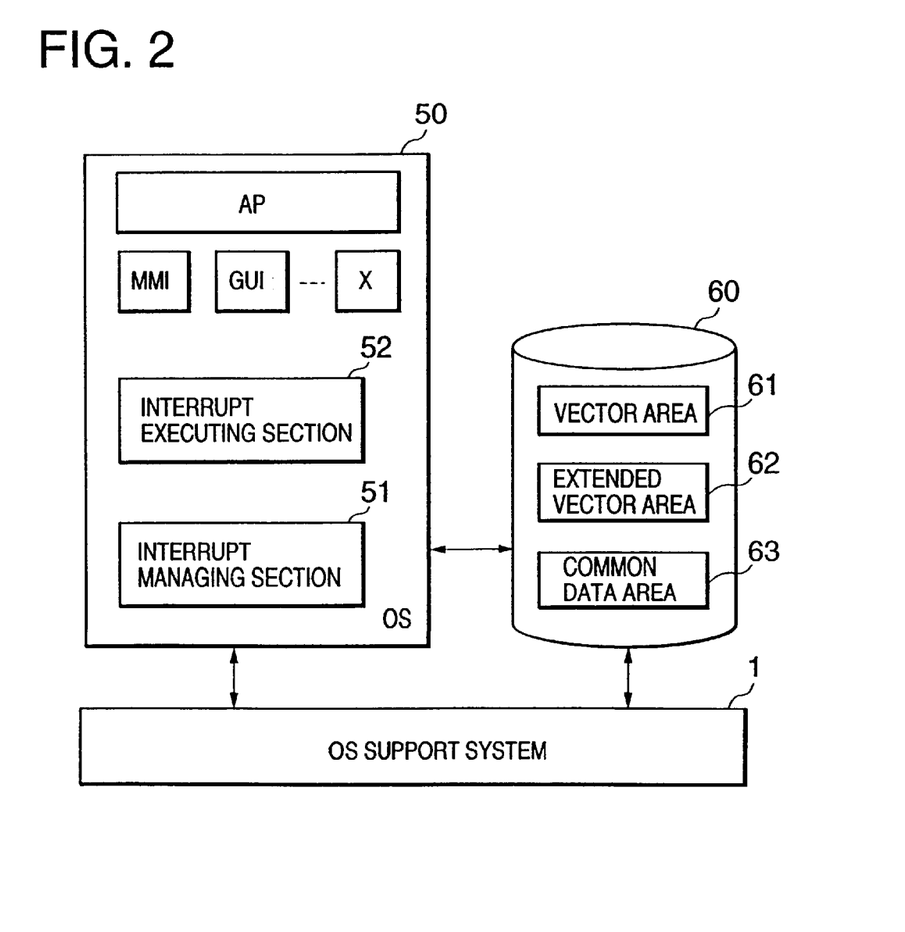
FIG. 2 is an explanatory diagram showing a relationship between an OS and an OS support system in the portable terminal shown in FIG. 1.

A relationship between the OS 50 and the OS support system 1 in the portable terminal is as shown in FIG. 2. In this embodiment, the OS 50 is a simple OS with a low realtime performance. The present invention, however, is not limited to such an OS.

The OS 50 comprises a man-machine interface (MMI), a graphical user interface (GUI) and other function realizing elements (X) which are used by various OS-side applications (AP). The OS 50 further comprises an interrupt managing section 51 which implements given interrupt management by referring to a vector area 61 provided in a fixed memory 60, and an interrupt executing section 52 which starts up and executes a corresponding interrupt handler. Upon initialization of the OS, the interrupt managing section 51 notifies a base address of the vector area 61 to the CPU and calls an initialization program of the OS support system 1. The interrupt executing section 52 starts up and executes interrupt handlers in the OS 50. The functions of the OS 50 other than the function of the interrupt managing section 51 to call the initialization program of the OS support system 1 can be realized by the known OS.

In addition to the vector area 61 managed by the OS 50, the fixed memory 60 further includes an extended vector area 62 managed by the OS support system 1, and a common data area 63 commonly used by the OS 50 and the OS support system 1. The extended vector area 62 and the common data area 63 are arranged outside the area managed by the OS 50 for avoiding the overhead of memory management.

Figure 3:
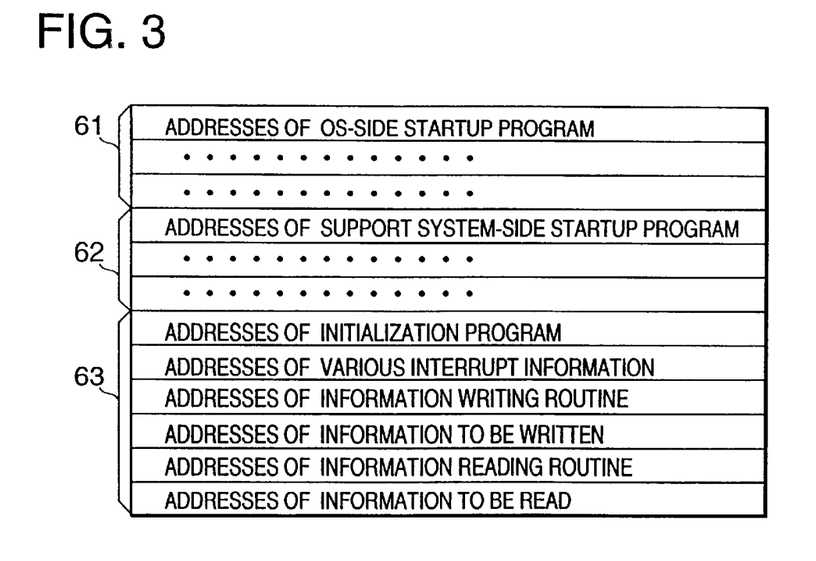
FIG. 3 is an explanatory diagram showing an example of the contents set in a vector area, an extended vector area and a common data area in a memory shown in FIG. 2.

The contents of data set in the vector area 61, the extended vector area 62 and the common data area 63 are as shown in FIG. 3.

In the vector area 61, addresses (pointers) of a startup program are set per interrupt cause so that a control right is transferred to a corresponding interrupt handler in the OS 50 when the interrupt processing is carried out at the side of the OS 50. On the other hand, in the extended vector area 62, addresses (pointers) of various startup programs at the side of the OS support system 1, such as a program for realizing a function of a later-described interrupt managing section 12, are set. The data stored in the common data area 63 are those data which mediate between the OS 50 and the OS support system 1. In this embodiment, addresses of an initialization program for the OS support system 1 which is referred to upon initialization of the OS 50, addresses of various interrupt information, addresses of an information writing routine, addresses of information to be written, addresses of an information reading routine and addresses of information to be read are set in the common data area 63.

The addresses of the initialization program, the addresses of the interrupt information and the addresses of the information writing routine are set at the time of arranging the common data area 63, while the addresses of the information reading routine and the addresses of the information to be read are set upon initialization of the OS 50.

Figure 4:
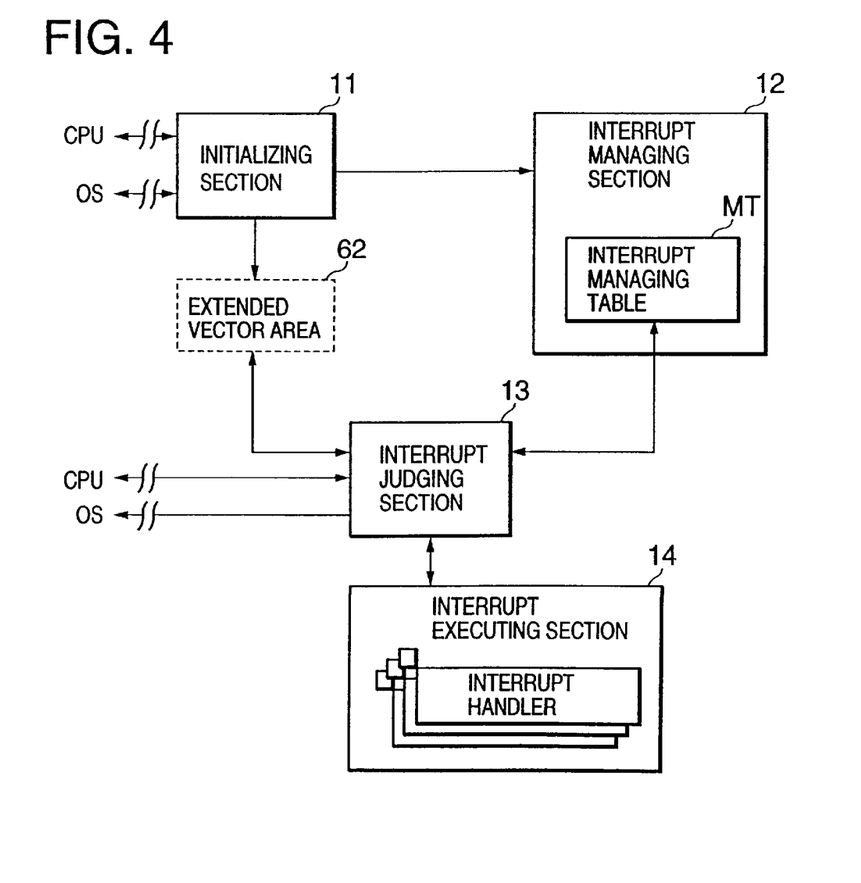
FIG. 4 is a functional diagram of the OS support system shown in FIG. 1.

FIG. 4 is a functional diagram of the OS support system 1.

The OS support system 1 comprises functional blocks of an initializing section 11, an interrupt managing section 12, an interrupt judging section 13 and an interrupt executing section 14.

The initializing section 11 is created through execution of the initialization program in the common data area 63 by the CPU upon initialization of the OS 50.

Figure 5:
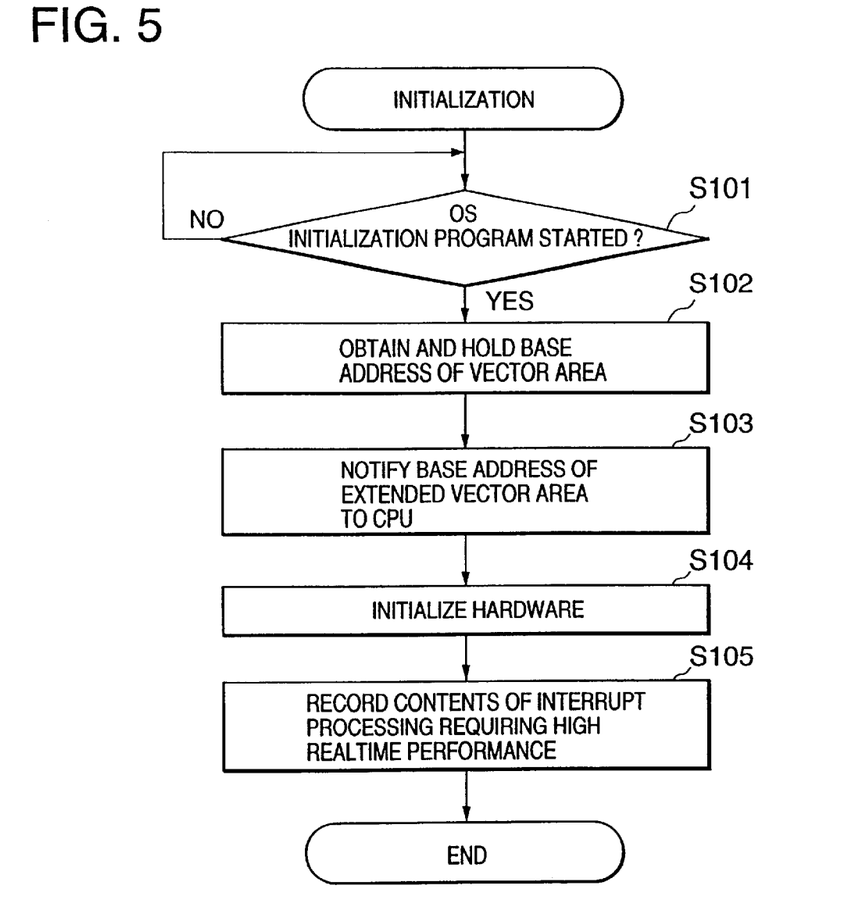
FIG. 5 is a flowchart of initialization processing carried out in the OS support system shown in FIG. 1.

In the initializing section 11, the initialization processing is implemented according to a flowchart shown in FIG. 5.

First, the initializing section 11 refers to a base address of the vector area 61 which is set through notification thereof to the CPU by the OS 50 upon initialization of the OS 50, and holds it in the extended vector area 62 as data of the OS support system 1 (Yes at step S101; step S102). Subsequently, the initialization section 11 notifies a base address of the extended vector area 62 to the CPU (step S103). Since the CPU has a function of changing the base address, the CPU changes the base address, which is to be first referred to, from the vector area 61 to the extended vector area 62 in response to the notification from the initializing section 11. As a result, the OS support system 1 can take an interrupt request from the CPU earlier than the OS 50 does.

Then, the initializing section 11 initializes a hardware to be controlled by the OS support system 1, i.e. the serial device 30 in this embodiment (step S104). The initializing section 11 further controls the interrupt managing section 12 to record the contents of the interrupt processing, i.e. addresses of an interrupt handler per interrupt cause, for which the high realtime performance is required, in an interrupt managing table MT (step S105). In practice, the initializing section 11 calls an initialization routine of the hardware and a program for creating a function of the interrupt managing section 12 and executes them. After finishing the foregoing initialization processing, the initializing section 11 transfers the control right to the OS 50.

Figure 6:
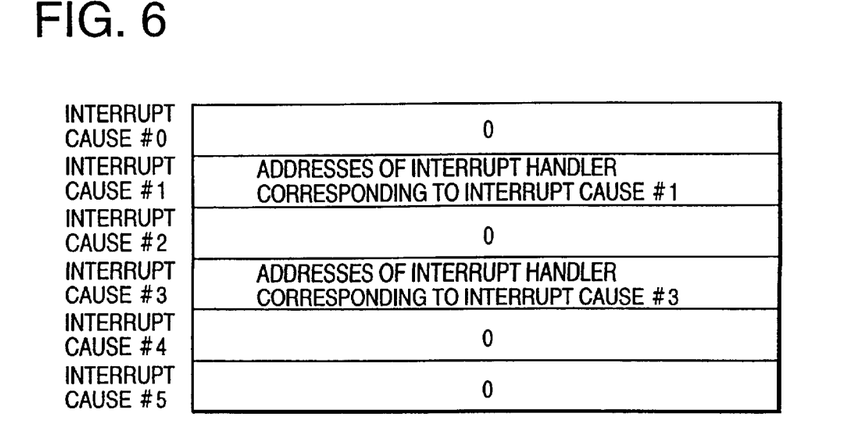
FIG. 6 is an explanatory diagram showing an example of the contents recorded in an interrupt managing table.

FIG. 6 shows an example of the contents recorded in the interrupt managing table MT. In the shown example, six interrupt causes #0 to #5 are recordable, wherein the interrupt causes #1 and #3 are interrupt causes requiring the high realtime performance, while the interrupt causes #0, #2, #4 and #5 represented by "0" are interrupt causes not requiring the high realtime performance.

Figure 7:
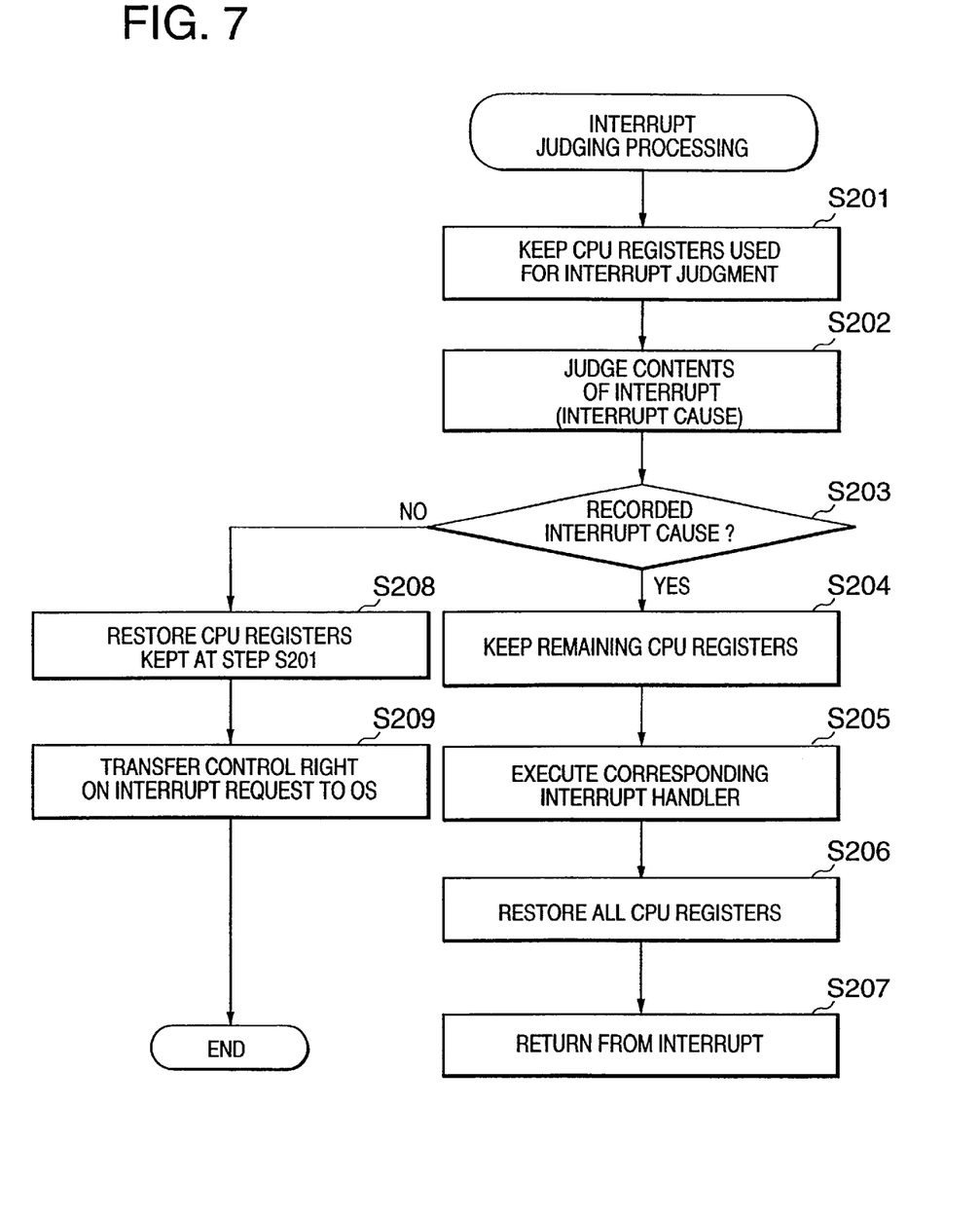
FIG. 7 is a flowchart of interrupt judging processing carried out in the OS support system shown in FIG. 1.

The interrupt judging section 13 is activated upon issuance of an interrupt request from the CPU and implements the interrupt judging processing according to a flowchart shown in FIG. 7.

First, only a part of operation environment information of the CPU, such as only the contents of CPU registers used for interrupt judgment, is temporarily stored in a non-shown stack for avoiding excess overhead (step S201). Thereafter, the interrupt judging section 13 obtains an interrupt request and judges whether the contents of the interrupt (interrupt cause corresponding to the interrupt request) are recorded in the interrupt managing table MT, i.e. whether it is the interrupt requiring the high realtime performance (step S202; step S203). As seen from FIG. 6, if the data is represented by other than "0" in the interrupt managing table MT, the interrupt judging section 13 judges that the interrupt requires the high realtime performance. Then, the interrupt judging section 13 holds the contents of the remaining CPU registers Yes at step S203; step S204) and requests the interrupt executing section 14 in the OS support system 1 to start up and execute a corresponding interrupt handler recorded in the interrupt managing table MT (step S205). After the control right is returned from the interrupt executing section 14 (corresponding interrupt handler), the interrupt judging section 13 restores the contents of all the CPU registers (step S206) and returns from the interrupt (step S207).

On the other hand, if the data is represented by "0" in the interrupt managing table MT at step S203, the interrupt judging section 13 judges that the interrupt does not require the high realtime performance. Then, the interrupt judging section 13 restores the contents of the CPU registers stored in the stack at step S201 (step S208) and transfers the control right on the interrupt request to the OS 50 (step S209). Specifically, the interrupt judging section 13 obtains addresses of an OS-side startup program corresponding to the interrupt request from the base address of the vector area 61 held by the initializing section 11 and transfers the control right to the program corresponding to the obtained addresses.

Figure 8:
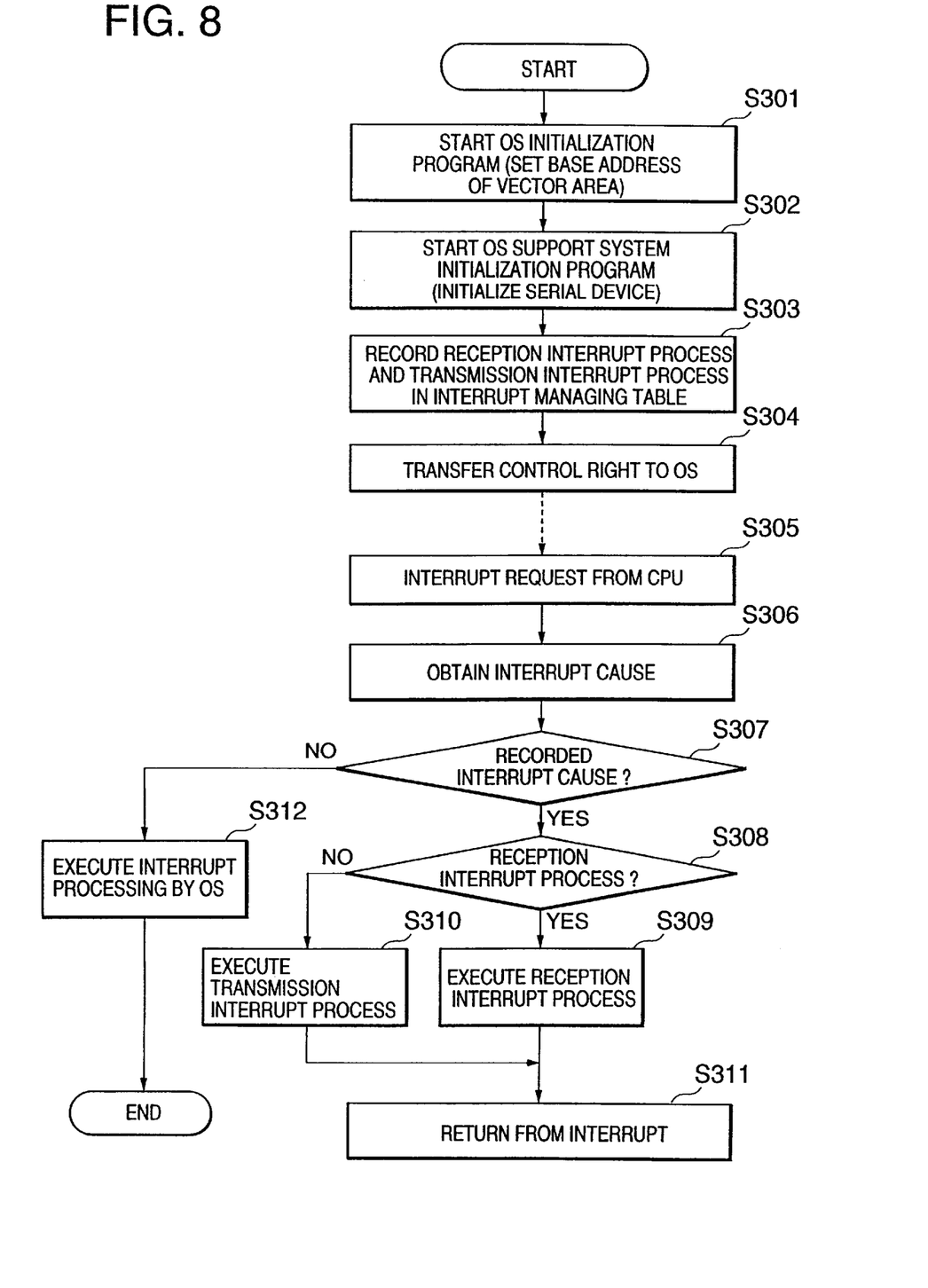
FIG. 8 is a flowchart showing operations of the portable terminal shown in FIG. 1, particularly operations thereof upon initiation and upon occurrence of an interrupt.

Now, the operations of the portable terminal according to this embodiment, particularly the operations thereof upon initialization and upon occurrence of an interrupt, will be described in detail with reference to a flowchart shown in FIG. 8.

For brevity of description, it is assumed that an interrupt process upon data reception (hereinafter referred to as "reception interrupt process") and an interrupt process upon data transmission (hereinafter referred to as "transmission interrupt process") are only recorded in the interrupt managing section 12 as interrupt processes which require the high realtime performance.

When the OS initialization program is started to initialize the OS 50, the base address of the vector area 61 is notified to the CPU (step S301). Then, the initialization program of the OS support system 1 is started so that the initialization is implemented according to the flowchart shown in FIG. 5 wherein the serial device 30 is initialized (step S302). Then, the reception interrupt process and the transmission interrupt process from the serial device 30 are recorded in the interrupt managing table MT (step S303). After finishing the initialization as described above, the OS support system 1 transfers a control right to the OS 50 and waits for an occurrence of an interrupt (step S304).

When an interrupt occurs for receiving or transmitting data by the serial device 30, the CPU issues an interrupt request of the reception or transmission interrupt process.

The OS support system 1 receives the interrupt request earlier than the OS 50 does (step S305; step S306). Then, the OS support system 1 makes a judgment on the interrupt request (step S307). Since only the reception interrupt process and the transmission interrupt process are recorded in the OS support system 1, the OS support system 1 transfers the control right on the interrupt request to the OS 50 if an interrupt cause corresponding to the interrupt request is not one of them. As a result, the OS 50 deals with the interrupt request at this time (No at step S307; step S312).

Figure 9:
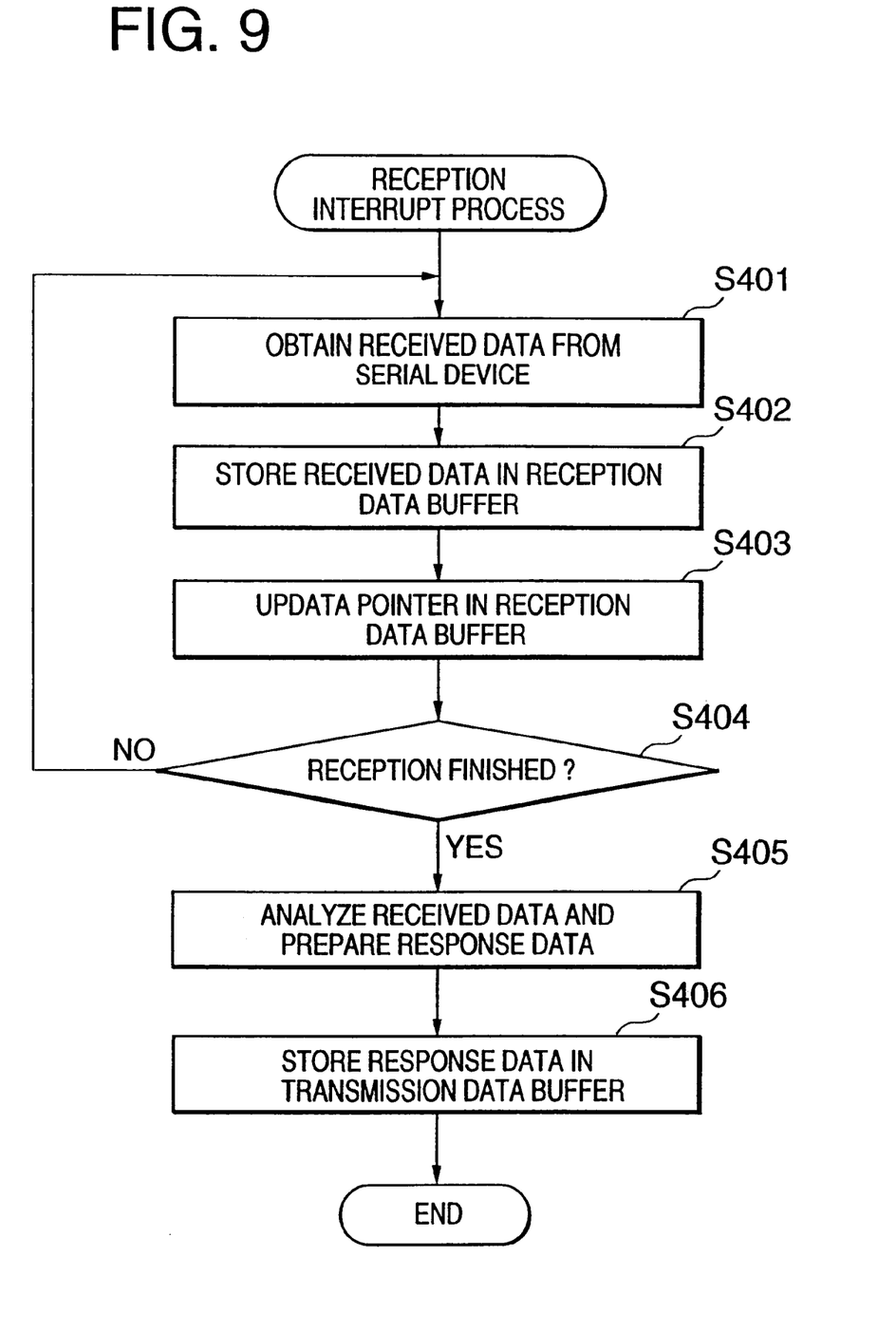
FIG. 9 is a flowchart of a reception interrupt process shown in FIG. 8.

On the other hand, if the interrupt request corresponds to the reception interrupt process, the reception interrupt process is implemented according to a flowchart shown in FIG. 9 (Yes at step S307; Yes at step S308; step S309). Similarly, if the interrupt request corresponds to the transmission interrupt process, the transmission interrupt process is implemented according to a flowchart shown in FIG. 10 (Yes at step S307; No at step S308; step S310). After execution of the reception interrupt process or the transmission interrupt process, the OS support system 1 transfers the control right to the OS 50 and waits for an occurrence of a next interrupt (step S311).

Referring to FIG. 9, the reception interrupt process will be briefly explained.

In the reception interrupt process, serial received data is obtained from the serial device 30 (step S401) and stored in the reception data buffer (step S402). Since a pointer in the reception data buffer changes while the received data is sequentially stored in the reception data buffer, the pointer is updated correspondingly (step S403; step S404). After storing all the received data, the received data is analyzed to prepare response data thereto (Yes at step S404; step S405) and the response data is stored in the transmission data buffer (step S406).

Figure 10:
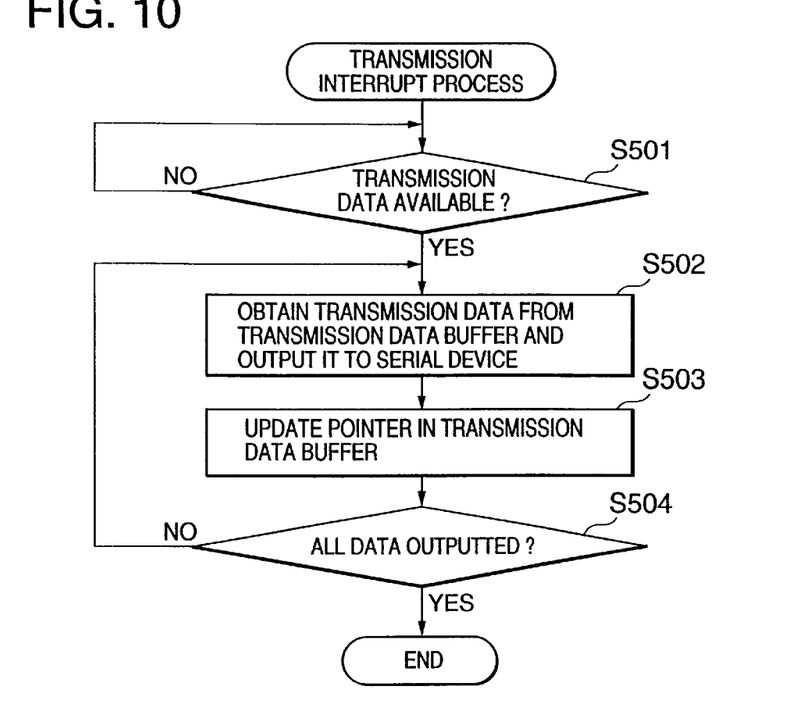
FIG. 10 is a flowchart of a transmission interrupt process shown in FIG. 8.

Referring to FIG. 10, the transmission interrupt process will be briefly explained.

In the transmission interrupt process, if there is a data transmission command from an application and there is transmission data, including the foregoing response data, in the transmission data buffer, the transmission data is obtained from the transmission data buffer and outputted to the serial device 30 (Yes at step S501; step S502). Since a pointer in the transmission data buffer changes while the transmission data is outputted, the pointer is updated correspondingly (step S503). The execution of steps S502 and S503 is repeated with respect to all the transmission data (No at step S504). When all the transmission data is outputted (Yes at step S504), the transmission interrupt process is finished, which is notified to the application via the OS 50.

As described above, in the portable terminal according to this embodiment, when the interrupt request requests execution of the reception interrupt process or the transmission interrupt process requiring the high realtime performance, the interrupt process is immediately executed in the OS support system 1 without being applied to the OS 50. Accordingly, even if the OS of the low realtime performance is used, the communication errors can be avoided so that the high-speed serial transmission is made possible.

Figure 11:
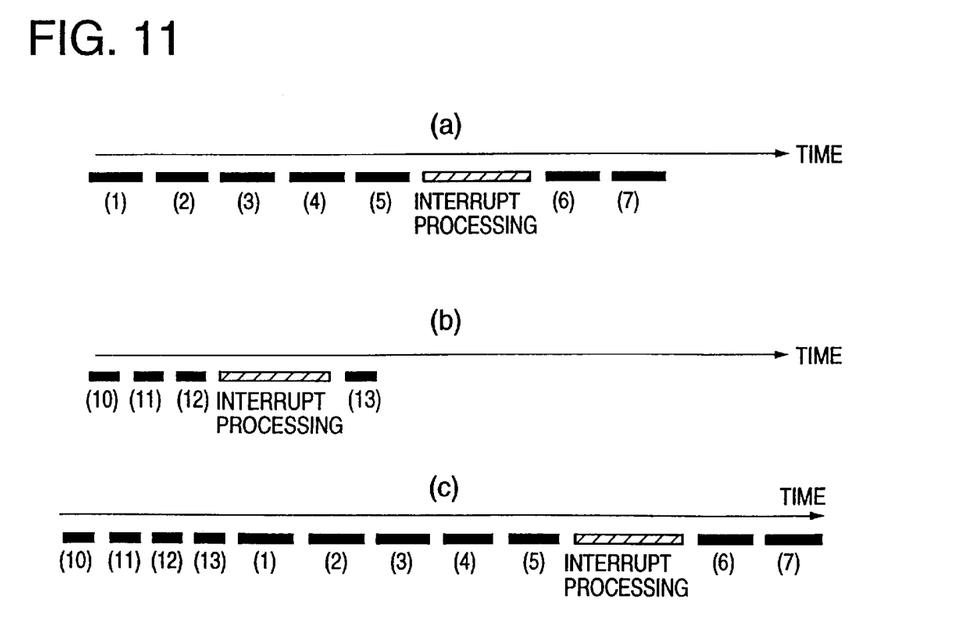
FIG. 11 is an explanatory diagram showing the timings of interrupt management.

The reason thereof will be explained with reference to a time chart shown in FIG. 11.

In the time chart, the upper part shows the interrupt execution timing in case of only the OS 50 being available, the middle part shows the interrupt execution timing in case the OS support system 1 judges that the high realtime performance is required, and the lower part shows the interrupt execution timing in case the OS support system 1 judges that the high realtime performance is not required.

In the time chart, (1) to (7) represent processes executed at the side of the OS 50 while (10) to (13) represent processes executed at the side of the OS support system 1. Specifically, (1) represents holding of the contents of CPU registers, (2) represents switching of a process execution mode to "interrupt processing", (3) represents confirmation of an interrupt cause, (4) represents confirmation of existence of an interrupt handler and (5) represents memory management prior to the interrupt processing. Further, (6) represents preparation of receiving a next interrupt request after execution of the interrupt processing and (7) represents restoration of the contents of the CPU registers. On the other hand, (10) represents holding of the contents of CPU registers, (11) represents confirmation of an interrupt cause, (12) represents confirmation of existence of an interrupt handler and (13) represents restoration of the contents of the CPU registers. In each of the upper, middle and lower parts, the axis of abscissa represents a time and a length of each segment corresponds to a length of time.

As seen from the time chart, the OS support system 1 requires only three processes after the reception of an interrupt request until the start of execution of a corresponding interrupt handler. Further, these processes are only for confirming whether an interrupt request corresponds to an interrupt handler which can be executed in the OS support system 1, thereby requiring only a short time. As a result, a time from the reception of an interrupt request to the start of execution of a corresponding interrupt process (handler) in the OS support system 1 can be shorter than a time from the reception thereof to the start of execution thereof in the OS 50, thereby ensuring the high realtime performance.

Further, in this embodiment, since the interrupt processing is implemented in the OS support system 1, a load in the OS 50 can be reduced correspondingly so that an influence to execution of other applications can be relaxed.

Further, in this embodiment, since a control right on an interrupt request corresponding to an interrupt process not recorded in the OS support system 1 is transferred to the OS 50, such an interrupt process can be implement in the OS 50 as if there were no OS support system 1. As a result, it is possible to enhance the realtime performance for given interrupt processes without relying on the specification of the OS 50 and while maintaining the identify of the contents of the OS 50, thereby capable of widely dealing with version-up or alteration of the OS 50.

Second Embodiment

In the foregoing first preferred embodiment, the OS and the OS support system are operated independently of each other. The present invention, however, is not limited thereto but also applicable to a case wherein the OS and the OS support system cooperatively implement an interrupt control.

In this embodiment, the present invention is applied to an information processing device incorporated in a control mechanism of a machine tool for a limbless wooden doll.

Figure 12:
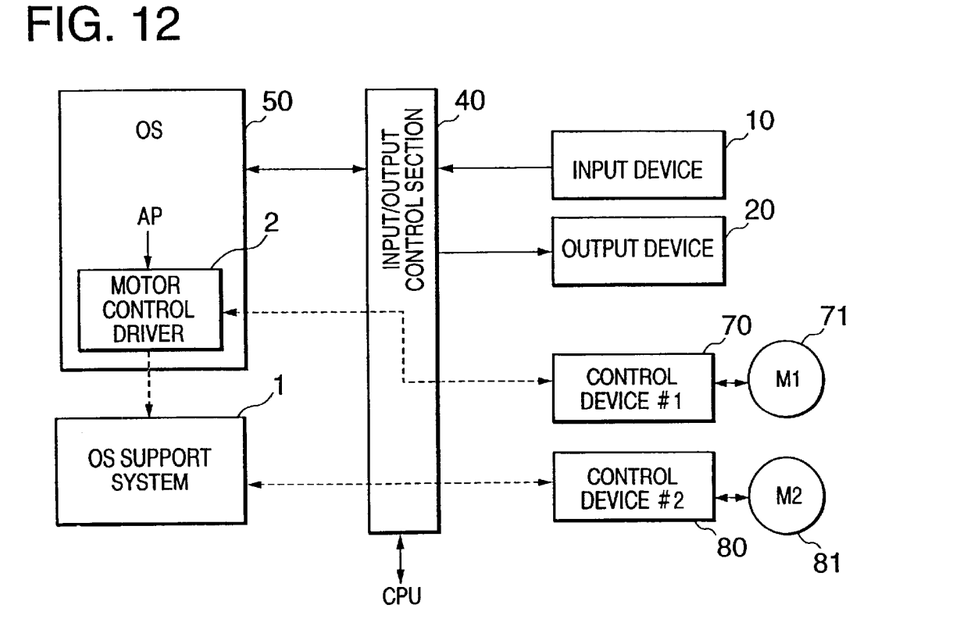
FIG. 12 is a diagram showing a configuration of the main part of an information processing device according to a second preferred embodiment of the present invention.

FIG. 12 is a diagram showing a configuration of the main part of an information processing device according to the second preferred embodiment of the present invention, wherein the same components as those of the portable terminal in the first preferred embodiment are assigned the same reference signs. In this embodiment, a motor control driver 2 is incorporated in an OS 50, but functions themselves of the OS 50 are the same as those of the OS 50 in the first preferred embodiment.

In FIG. 12, the information processing device has an input/output control section 40 to which control devices 70 and 80 for controlling two kinds of motors (M1) 71 and (M2) 81 forming a part of the machine tool are connected.

The motor (M1) 71 is a motor for rotating a wooden material of the doll about an axis thereof. The control device 70 implements an ON/OFF control of the motor (M1) 71 and produces an interrupt when the rotation of the motor becomes stable.

The motor (M2) 81 is a motor for driving a cutter. The control device 80 produces an interrupt when the motor (M2) 81 is displaced by an amount on moving coordinates designated by an operator via an input device 10.

Based on a diameter of the wooden material and a shape pattern of the doll designated by the operator via the input device 10, an OS-side application (AP) calculates motor control data for forming the doll, i.e. a displacing direction and a displacing amount of the motor (M2) 81, and produces a string of those data. Further, the application (AP) outputs an interrupt request for a rotation command and an interrupt request for a rotation stop command for the motor (M1) 71 and an interrupt request for an operation start command for the motor (M2) 81, to the motor control driver 2. The interrupt for the operation start command for the motor (M2) 81 is carried out along with the produced motor control data.

The motor control driver 2 is a control driver for realizing cooperation between the OS 50 and an OS support system 1. The motor control driver 2 receives the foregoing interrupt requests from the application (AP) and has a function of allowing the OS 50 to implement a control of the motor (M1) 71 and commanding a control of the motor (M2) 81 to the OS support system 1. Upon commanding the control of the motor (M2) 81, the motor control driver 2 copies, when there exist n motor control data from the application (AP), the second and subsequent data and information that there exist n−1 data, into an internal memory such as a buffer of the OS support system 1, and then outputs the first data to the control device 80.

When detection is made from an interrupt that the control of each of the motors 71 and 81 has been normally finished, the motor control driver 2 notifies it to the application (AP) using a function of the OS 50.

With respect to the OS support system 1, addresses of an initialization program like that in the portable terminal in the first preferred embodiment and the head address of the foregoing buffer storing the motor control data are stored as data to be called by the OS 50. Further, an interrupt handler of the motor (M2) 81 is recorded in an interrupt managing table. This interrupt handler has the execution contents wherein the OS support system 1 outputs the motor control data to the control device 80 in sequence and, when all the motor control data have been outputted, a control right is transferred to the interrupt contents of the control device 80 set in a vector area of the OS 50. Then, at the side of the OS 50 having received the control right, an interrupt managing section is activated to start and execute an interrupt handler of the motor control driver 2 by referring to an interrupt cause (interrupt contents from the control device 80) held in an interrupt register of the CPU.

Figure 13:
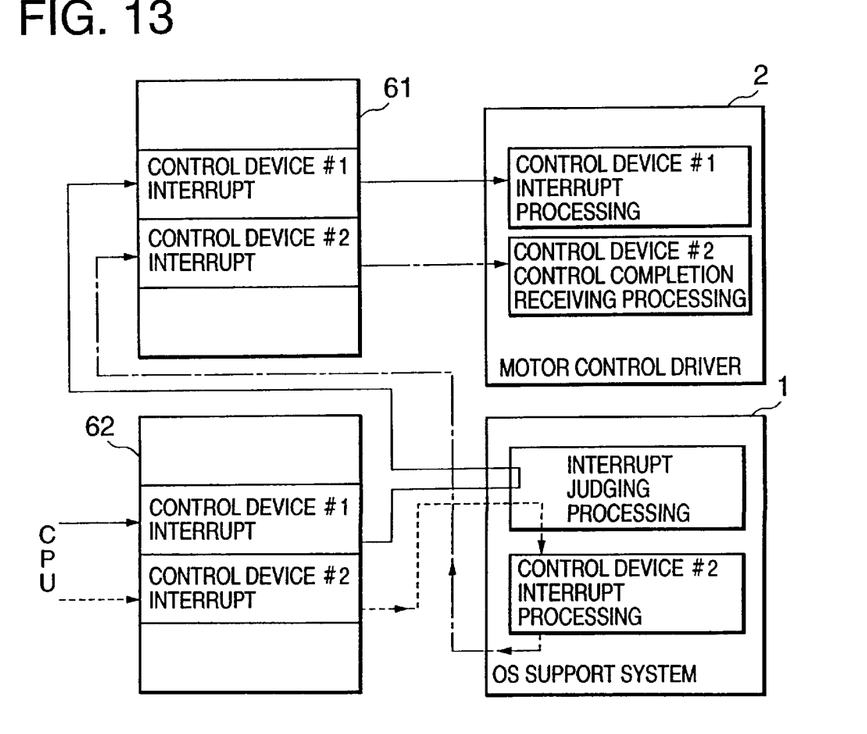
FIG. 13 is a diagram for explaining operations of the information processing device shown in FIG. 12.

FIG. 13 is a conceptual diagram of the processing Implemented by the information processing device, wherein numeral 61 denotes a vector area at the side of the OS 50, while numeral 62 represents an extended vector area at the side of the OS support system 1. Interrupts of the control devices 70 and 80 are set in each of the areas 61 and 62. In FIG. 13, the solid line represents a notification route of an interrupt from the control device 70, the broken line a notification route of an interrupt from the control device 80, and the alternate long and short dash line a notification route at the completion of a motor control. For brevity of description, a common data area is omitted in FIG. 13.

In the information processing device according to this embodiment, since the motor (M1) 71 is controlled by the OS 50 while the motor (M2) 81 is controlled by the OS support system 1, an interrupt process requiring a high realtime performance and an interrupt process not requiring it can be executed in a shared manner.

In the present invention, it is sufficient that an interrupt request addressed to an OS is received by an OS support system earlier than the OS so as to be judged whether it is handled by the OS or the OS support system. Accordingly, there is no particular limitation to an interrupt managing manner adopted by the OS.

As appreciated from the foregoing description, according to the present invention, the realtime performance for an interrupt can be enhanced without altering an OS installed in an information processing device.

While the present invention has been described in terms of the preferred embodiments, the invention is not to be limited thereto, but can be embodied in various ways without departing from the principle of the invention as defined in the appended claims.

What is claimed is:

1. An interrupt processing method to be performed in an information processing device in which an interrupt managing function and an OS support system for executing a given interrupt process coexist together with maintaining the identity of said OS, said interrupt process requires a high realtime performance, wherein
said OS support system performs the processing of:
receiving an interrupt request produced by said information processing device earlier than said OS does;
judging whether said interrupt request corresponds to said given interrupt process; and
executing said given interrupt process when said interrupt request corresponds to said given interrupt process while transferring a control right on said interrupt request from said OS support system to said OS when said interrupt request does not correspond to said given interrupt process.

2. The interrupt processing method according to claim 1, wherein a time required by said OS support system after receipt of said interrupt request until starting execution of said given interrupt process is shorter than a time required by said OS after receipt of said interrupt request until starting execution of a corresponding interrupt process.

3. The interrupt processing method according to claim 1, wherein a driver is incorporated in said OS for exchanging information with said OS support system with maintaining the identity of said OS, and wherein said OS and said OS support system execute different interrupt processes in the same hardware in a shared manner via said driver.

4. The interrupt processing method according to claim 1, wherein said information processing device being existing device in which said OS is installed, and said OS support system is installed in said existing device, thereby said OS coexists with said OS support system.

5. An OS support system which coexists with an OS having an interrupt processing function in an information processing device with maintaining the identity of said OS, and is activated through initialization of said OS, said system comprising:
an interrupt recording section for recording contents of an interrupt process requiring a high realtime performance;
an interrupt judging section for receiving an interrupt request earlier than said OS does when said interrupt request occurs in said information processing device, and judging whether said interrupt request corresponds to the interrupt process recorded in said interrupt recording section; and
an interrupt executing section for executing said interrupt process when said interrupt request corresponds to said interrupt process,
wherein said OS support system executes an interrupt process independently of said OS, and, as to an interrupt process which is not recorded in said interrupt recording section, said OS executes the same.

6. The OS support system according to claim 5, wherein a control driver is incorporated in said OS for realizing cooperation with said OS support system, and wherein said OS support system implements interrupt processing cooperatively with said OS in a shared manner.

7. An information processing device comprising a CPU issuing an interrupt request, an OS having an interrupt vector area and an OS support system having an extended interrupt vector area,
wherein said CPU is capable of changing a base address of said interrupt vector area or said extended interrupt vector area to be referred to,
wherein said interrupt vector area is set so that a control right is transferred to an interrupt process in said OS, and
wherein said OS support system sets contents of said extended interrupt vector area so that a control right is transferred to an interrupt process in said OS support system, notifies the base address of said extended interrupt vector area to said CPU for referring thereto so as to receive said interrupt request earlier than said OS does, and
said OS support system executes, when said interrupt request is recorded in said extended interrupt vector area, the interrupt process, and said OS support system transfers, when said interrupt request is not recorded in said extended interrupt vector area, a control right on said interrupt request to said OS according to contents set in said interrupt vector area, and the OS support system coexists with said OS with maintaining and identity of said OS.

8. The information processing device according to claim 7, wherein said OS support system holds a part of operation environment information of the CPU upon judging whether said interrupt request corresponds to a given interrupt process and, when said interrupt request corresponds to said given interrupt process, said OS support system holds the remaining part of said operation environment information and executes said given interrupt process and, when said interrupt request does not correspond to said given interrupt process, said OS support system restores said part of operation environment information and transfers the control right to said OS.

9. The information processing device according to claim 7, further comprising a transmission section for producing interrupts upon receiving data and upon transmitting data, and wherein said interrupts are inputted to said OS support system.

10. The information processing device according to claim 7, further comprising a control driver for realizing cooperation between said OS and said OS support system, wherein said OS and said OS support system execute different interrupt processes for a control object cooperatively with each other in a shared manner.

11. A storage medium storing digital information readable by an information processing device installing an OS having an interrupt processing function, said digital information creating in said information processing device with maintaining the identity of said OS:

an interrupt recording section for recording contents of an interrupt process requiring a high realtime performance;

an interrupt judging section for receiving an interrupt request earlier than said OS does when said interrupt request occurs in said information processing device, and judging whether said interrupt request corresponds to the interrupt process recorded in said interrupt recording section;

an interrupt executing section for executing said interrupt process when said interrupt request corresponds to said interrupt process; and a section for transferring a control right on said interrupt request to said OS when said interrupt request does not correspond to said interrupt process.

* * * * *